United States Patent [19]

Shiba

[11] 4,385,734
[45] May 31, 1983

[54] RING WITH RIB FOR WINDING MAGNETIC TAPE

[75] Inventor: Haruo Shiba, Tokyo, Japan

[73] Assignee: TDK Electronics Co., Ltd., Tokyo, Japan

[21] Appl. No.: 224,688

[22] Filed: Jan. 13, 1981

[30] Foreign Application Priority Data

Feb. 5, 1980 [JP] Japan .................. 55-13040[U]

[51] Int. Cl.³ .................................... B65H 75/18
[52] U.S. Cl. ............................ 242/68.5; 206/394; 206/509
[58] Field of Search ............... 242/68.5, 71.8, 118.3, 242/118.31, 118.32, 118.41; 206/389, 391, 394, 503, 509

[56] References Cited

U.S. PATENT DOCUMENTS 4,081,151 3/1978 Ender et al. .................. 242/68.5
4,201,353 5/1980 Schor ............................ 242/68.5

Primary Examiner—John M. Jillions
Attorney, Agent, or Firm—Oblon, Fisher, Spivak, McClelland & Maier

[57] ABSTRACT

A ribbed ring for winding a magnetic tape cut in narrow width is disclosed which has an annular outer peripheral part and a groove for reinforcing the ring against deformation and a rib for fitting to a groove of an adjacent ring and an annular inner peripheral part having one or more slits for fitting to a spline shaft.

3 Claims, 5 Drawing Figures

RING WITH RIB FOR WINDING MAGNETIC TAPE

BACKGROUND OF THE INVENTION

1. Field of the Invention

The present invention relates to a reel used in a preparation of a magnetic tape to wind a magnetic tape slitted in a narrow width. More particularly, it relates to a ribbed ring for winding a magnetic tape which has high bending strength and is not deformed during stacking of a plurality of the rings.

2. Description of the Prior Art

The ribbed rings for winding a magnetic tape are assembled with a spacer between adjacent rings and a winding shaft through which the rings and spacers are inserted so as to continuously wind magnetic tapes cut in each suitable width such as about 4 mm, at high revolutional velocity against winding resistance. Therefore, it is necessary to have sufficiently high strength so as to be durable under the severe conditions of high speed revolution and sudden stopping and high accuracy for winding under such severe condition, and to closely contact them without a gap when the ribbed rings are piled together for storage. In the stacked storage of the ribbed rings, it is necessary to fix the ribbed rings so as to prevent sliding and to prevent deformation thereof.

It has been known to fit each projection and each hole for mutually fixing reels for preventing sliding in the field of the reels for winding a magnetic tape. This structure has been used for ribbed rings. That is, several slits for fitting the ribbed rings to the winding shaft are formed at several positions on each inner surface of each ribbed ring and each projection for reinforcing each slit is formed around the slit and each concave or recess for receiving each projection for reinforcing is formed at the side of each reinforcing part. These parts have certain effect for stacking the ribbed rings however the parts have no effect for reinforcing the rings. Moreover, the reinforcing parts have no effect for reinforcing the rings themselves. When the reinforcing parts are provided, deformation of the rings made of a synthetic resin may be caused by the width deflection etc.

SUMMARY OF THE INVENTION

It is an object of the present invention to overcome the disadvantages and to provide a ribbed ring for winding a magnetic tape which has high bending strength and is not crumbled during stacking a plurality of the rings.

The foregoing and other objects of the present invention have been attained by providing a ribbed ring for winding a magnetic tape cut in narrow width which comprises an annular outer peripheral part and a groove for reinforcing the ring against deformation and a rib for fitting to a groove of an adjacent ring and an annular inner peripheral part having one or more slits for fitting to a spline shaft.

DETAILED DESCRIPTION OF THE PREFERRED EMBODIMENTS

Figure 1:
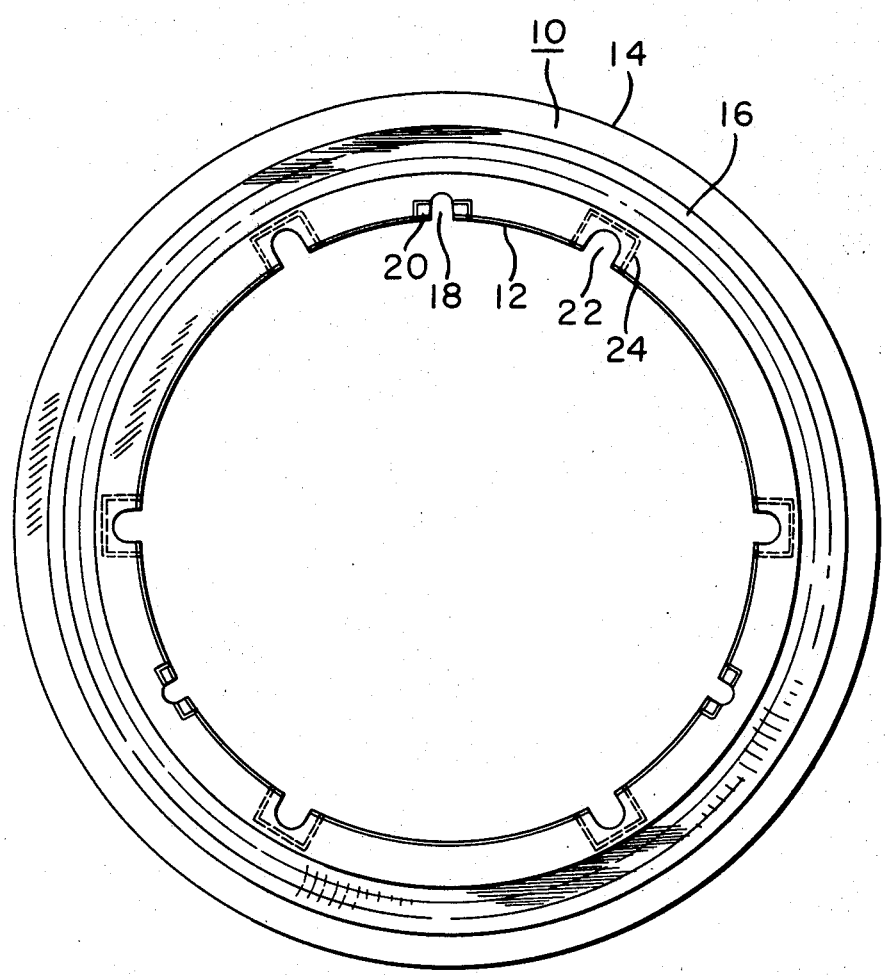
FIG. 1 is a plane view of one embodiment of a ring with rib according to the present invention.
Figure 2:
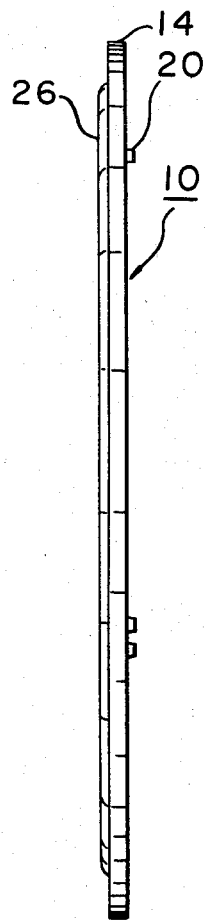
FIG. 2 is a left side view of the embodiment.
Figure 3:
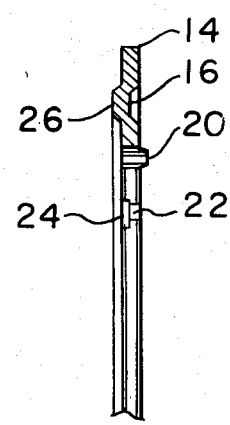
FIG. 3 is a sectional view of the embodiment shown in FIG. 2.
Figure 4:
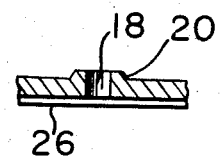
FIG. 4 is a sectional view of a slit.
Figure 5:
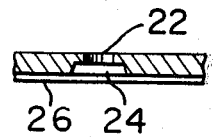
FIG. 5 is a sectional view of a recess.

Referring to the drawings, one embodiment of the present invention will be illustrated in detail.

In the plane view of FIG. 1, both of an inner peripheral surface (12) and an outer peripheral surface (14) of the ribbed ring made of a hard plastic are in concentric circles. An annular groove (16) is formed in a concentric circle to the inner peripheral surface (12) substantially in the middle between the inner peripheral surface (12) and the outer peripheral surface (14). The width of the groove (16) can be about ⅓ of the width of the ring (10) and can be made of one or two slant parts and a flat bottom (or round part). The depth of the groove (16) can be about a half of the thickness of the ring (10). The inner peripheral surface (12) of the ring (10) has U-shaped slits (18) which correspond to splines projected on a spline shaft for winding (not shown) so as to inwardly open the U-shaped slits at trisector positions on the inner peripheral surface. Each reinforcing projection (20) is formed around the slit (18) in a suitable width such as about 2 mm in the front side. Each U-shaped recess (22) which is larger than the slit (18) is formed at sector positions on the inner peripheral surface of the ring (10) adjacent to the slits (18). Each rectangular concave (24) having suitable depth and shape for receiving the reinforcing projection (20) of an adjacent ribbed ring, is formed around the recess (22) in the back side. The rib (26) is projected in the back side of the ring (10) corresponding to the groove (16) formed in the front side of the ring (10).

In this embodiment, only one pair of the groove (16) and the corresponding rib (26) are formed on the ring with rib (10), however, number of the grooves and ribs is not limited to one. A plurality of pairs of the grooves and the corresponding ribs can be formed. The adjacent groove and the rib are alternately formed on the front and back sides of the ring so as to be S-shaped sectional view of the middle of the ring. The height of the rib need not reach the bottom of the groove, but the rib should fit to the groove. It is not always necessary to form the groove on one surface and to form the rib on the other surface. It is possible to alternately form grooves and ribs each 1/12 of the peripheral part, as convexes and concaves.

In accordance with the present invention, significant advantages are found. For example, the bending strength of the ring for winding a magnetic tape can be increased in a simple structure by forming the groove and the rib as concavo-convex surfaces whereby a relatively soft synthetic resin which is not brittle can be used for the ring. The thicknesses of the reinforcing concavo-convex surfaces can be constant without thickness deflection. The ribbed ring having high accuracy can be fabricated without any strain and deformation even by an injection molding. The rings can closely contact without gap in stacking of the rings. The close contact area of the ribbed rings is remarkably broad to prevent crumbling and deformation of the rings.

The present invention has been illustrated by certain embodiments which are provided for purposes of illustration only and are not intended to be limiting the present invention.

I claim:

1. An annular ring for receivably winding narrow magnetic tape, the improvement comprising:

a reinforcing annular groove formed on one side of said ring and concentric therewith;

a rib formed on the opposite side of said ring whereby said rib is formed to receive a groove of an adjacent annular ring;

at least one slit formed on the inner surface of said ring for receiving a spline shaft;

a plurality of reinforcing projections formed on said inner surface of said ring;

a plurality of recesses formed on said inner surface of said ring and a corresponding plurality of rectangular concaves are each formed around each of said recesses so that said recesses and concaves are formed to receive one of a reinforcing projection on an adjacent ring.

2. The ring according to claim 1 wherein each of said reinforcing projections are formed around a corresponding one of said slits.

3. The ring according to claim 1 or 2 wherein said groove and said rib are formed as concavo-convex surfaces, respectively.

* * * * *